May 4, 1954 K. SCHLESINGER 2,677,786

TELEVISION CIRCUIT

Filed Oct. 21, 1950 2 Sheets-Sheet 1

FIG. I

INVENTOR.
Kurt Schlesinger

BY Foorman L. Mueller

Atty.

INVENTOR.
Kurt Schlesinger
BY Foorman L. Mueller
Atty.

Patented May 4, 1954

2,677,786

UNITED STATES PATENT OFFICE 2,677,786

TELEVISION CIRCUIT

Kurt Schlesinger, Maywood, Ill., assignor to Motorola, Inc., Chicago, Ill., a corporation of Illinois Application October 21, 1950, Serial No. 191,477

13 Claims. (Cl. 315—30)

The present invention relates to a television receiver, and more particularly, to the video output circuit of such a receiver.

One of the primary requisites for the production of a good picture on the screen of a television receiver, is the provision of a high intensity video signal at the input electrodes of the television picture tube. The picture contrast is dependent upon the alternating and direct current components of the video signal, and also upon the absolute value of the signal applied to the input electrodes of the cathode ray tube picture reproducing device. Therefore all of these factors must be considered in the development of a video output circuit. The problem of providing a simple circuit for producing such a video signal is complicated by the fact that the circuit must not adversely affect the wave shape of the video signal applied to the picture reproducing tube.

It is therefore an object of the present invention to provide a simple circuit for providing improved picture contrast in a television receiver.

Another object of the invention is to provide a video output circuit in which the direct and alternating current components can be maintained in the proper proportion so that reinserting means is not required.

Still another object of the invention is to provide a video output circuit in which the picture contrast can be changed without adversely effecting the background setting of the picture being presented.

A feature of the invention is the provision of a push-pull intensifier circuit for coupling the output of the video amplifier section of a television receiver to the input electrodes of the cathode ray tube picture reproducing device.

Another feature of the invention is the provision of an input coupling circuit including an electron discharge device having both plate and cathode load resistors, with the signal across each being individually connected to the input electrodes of the cathode ray picture tube.

Still another feature of the invention is the provision of a video input coupling circuit for a television picture tube which has separate paths for applying the D. C. and A. C. components of the received television signal to the picture tube so that variation of the alternating current component of the signal does not effect the direct current component which controls the background of the picture.

A further feature of this invention is the provision of an electron discharge device in which an input signal is applied to the control grid thereof and an output signal is derived from the cathode load resistor, with a compensating capacitor connected between the grid and the cathode thereof so that the signal across the load resistor follows the applied signal very rapidly and the wave shape of signals coupled through the circuit is maintained.

A still further feature of the invention is the provision of a two stage video circuit for use in a television receiver wherein the relative proportions of the direct and alternating current components of the received television signal reproduced by the two stages compensate for each other and the desired proportion is provided so that separate means for direct current reinsertion is not required.

Other objects, features, and many of the attendant advantages of this invention will become better understood upon consideration of the following description together with the accompanying drawings wherein.

In practicing the invention, a television receiver is provided having a video frequency coupling circuit which applies output signals in push-pull to two input electrodes of the cathode ray picture tube. The coupling circuit includes an electron discharge valve having a control grid to which the signal is applied, a first load resistor connected to the plate thereof, and a second load resistor, substantially equal in value to the first load resistor, connected to the cathode. The plate may be connected to one of the input electrodes of the picture tube through circuit means which passes the alternating current component of the signal only, with the cathode being connected to the other input electrode of the picture tube through a circuit for passing both direct and alternating current components of the signal so that the effect of the alternating current component is thereby intensified. The proper proportion of direct current and alternating current components may be provided by the use of an amplified direct current restoring circuit coupled to the cathode load resistor, or by providing increased amplification of the direct current component in the preceding stage of the circuit so that the signal applied to the control grid of the output discharge valve has an amplified direct current component. In order that the signal across the cathode load resistor of the output valve rapidly follows the signal applied to the grid thereof, a small coupling capacitor may be connected between the control grid and the cathode. This reduces distortion of the wave form of the video signal.

Figure 1:
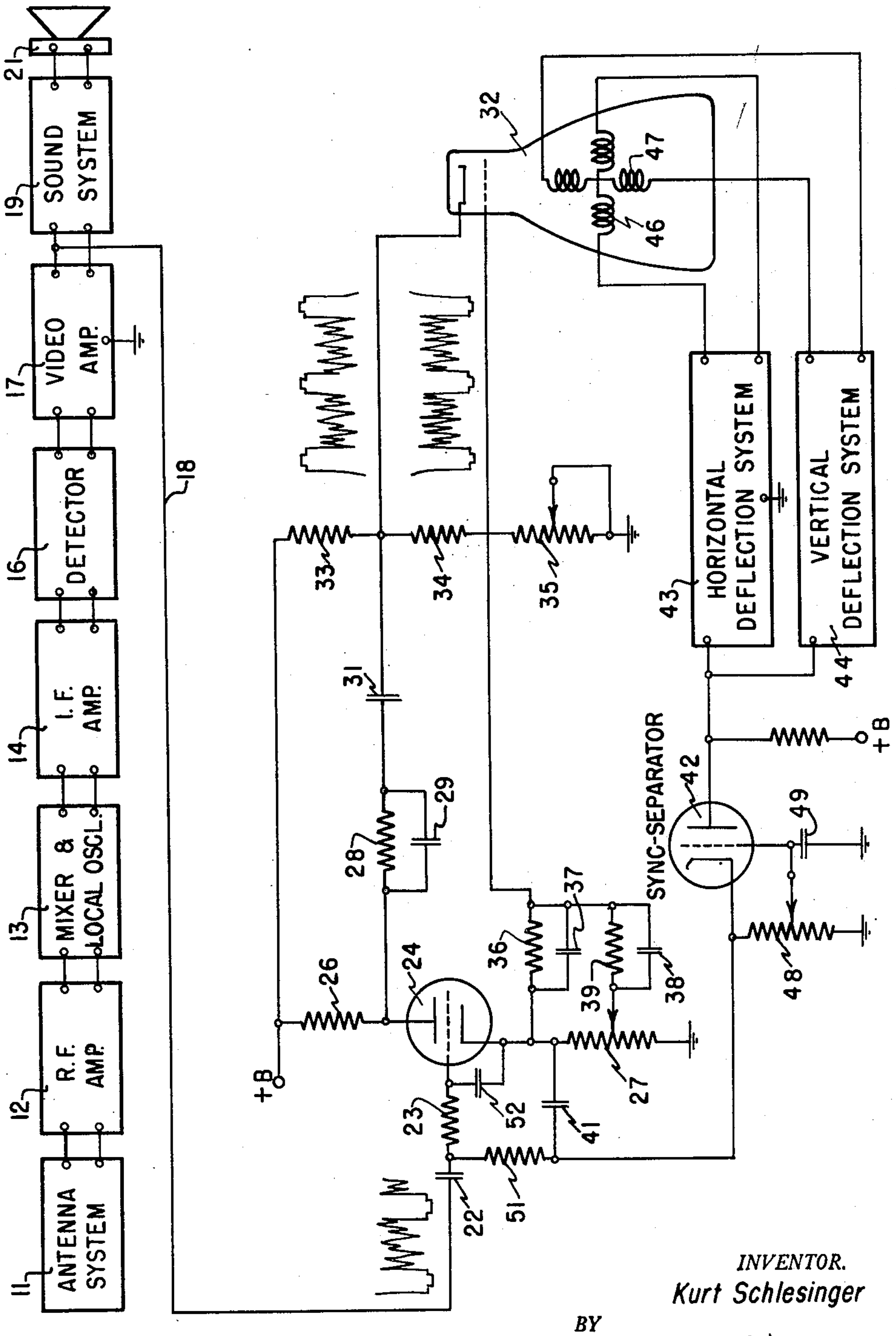
Fig. 1 is a circuit diagram of a television receiver in accordance with the invention with the standard components of the receiver shown in block form.

Referring now to Fig. 1 of the drawings, a television receiver circuit having a video output circuit in accordance with the invention is shown. The receiver includes an antenna system 11 having its output coupled to a radio frequency amplifier 12 which is in turn coupled to a mixer and local oscillator 13 wherein the received television signal is reduced in frequency by the well known superheterodyning action. The mixer and local oscillator 13 is coupled through an intermediate frequency amplifier 14 to a detector 16 wherein a composite video signal including synchronizing pulses and a sound signal are derived. Detector 16 has its output coupled to video amplifier stage 17 which applies the video signal to a conductor 18 and the sound signal to a sound system 19 wherein the accompanying audio signal portion of the received television signal is derived and reproduced by sound reproducing device 21. As the circuitry heretofore described may be of any desired standard construction, further elaboration of this portion of the receiver is not believed necessary.

The video signal from video amplifier stage 17 applied through conductor 18 is coupled through capacitor 22 and resistor 23 to the control grid of an electron discharge valve 24. The electron discharge valve 24 has its plate connected through a load resistor 26 to a source of positive potential B+, and has its cathode connected through a second load resistor 27 to a point of reference potential, which may be ground. The signals developed across the load resistors 26 and 27 are then applied to the cathode and grid of the cathode ray tube 32. The plate of electron discharge valve 24 is coupled through a circuit comprising a resistor 28 and a capacitor 29 in parallel, and through a coupling capacitor 31 in series to the cathode of the cathode ray picture tube 32. The cathode of picture tube 32 is also connected to the midpoint of a voltage dividing network comprising a plurality of resistors 33, 34 and 35, resistor 35 being variable to provide a variable bias for controlling the background of picture tube 32. The signal developed across load resistor 27 is applied through circuit means comprising capacitor 37 and resistor 39 connected in parallel to the cathode of valve 24, and through circuit means including a capacitor 38 and a resistor 39 which may be variably connected to any desired point along the cathode load resistor 27, to the control grid of picture tube 32.

For removing synchronization pulses from the video signal and restoring the direct current component thereto, a second electron discharge valve 42 is provided. The signal across the cathode load resistor 27 is applied through capacitor 41 to the cathode of the valve 42. Electron discharge valve 42 is adjusted to operate as a clipping device for separating the synchronizing pulses from the video signal, and has its output coupled in parallel to a horizontal deflection system 43, and a vertical deflection system 44, which individually supply horizontal deflection coils 46 and vertical deflection coils 47 at the picture tube 32. Electron discharge valve 42 is biased to operate to provide grid rectification and for this purpose a grid biasing system is provided including potentiometer 48 connected between the cathode and ground with the movable top thereon connected to the control grid, and a capacitor 49 connected between the grid and ground. The direct current bias built up across resistor 48 because of the grid rectification is coupled back through resistor 51 to the control grid of electron discharge valve 24, and serves to reinsert the direct current component of the received television signal at this control grid.

In order to reduce the effect of the time lag of the cathode of the electron discharge valve 24, with respect to the voltage applied to the grid thereof, a small coupling capacitor 52 is connected between the control grid and the cathode of the discharge device. This reduces the distortion of trailing edges of sharp pulses in the signal. The capacitor 52 must be kept small so that it will not substantially load the preceding stage.

In constructing the above described circuit, the following are representative values of the circuit parameters.

| | | |
|---|---|---|
| Capacitor 22 | micromicrofarads | .02 |
| Resistor 23 | ohms | 100 |
| Resistor 26 | do | 3,300 |
| Resistor 27 | do | 5,000 |
| Resistor 28 | do | 10,000 |
| Capacitor 29 | micromicrofarads | 100 |
| Capacitor 31 | microfarads | .05 |
| Resistor 33 | ohms | 100,000 |
| Resistor 34 | do | 33,000 |
| Resistor 35 | do | 25,000 |
| Resistor 36 | do | 32,000 |
| Capacitor 37 | micromicrofarads | 100 |
| Capacitor 38 | microfarads | .1 |
| Resistor 39 | ohms | 270,000 |
| Capacitor 41 | microfarads | .1 |
| Resistor 48 | ohms | 390,000 |
| Capacitor 49 | microfarads | .1 |
| Resistor 51 | ohms | 560,000 |

The above recited values were utilized in circuits found to be highly satisfactory, but it is to be understood that they are merely representative of one system constructed in accordance with the invention, and the invention is not restricted to these values alone.

Considering now the operation of the system of Fig. 1, by proper adjustment of the grid bias of electron discharge valve 24, the stage including this value can perform the quadruple function of noise-clipping, impedance transformation, amplification and contrast control. Thus, electron discharge device 24 receives a negative going video signal having a relatively high level with strong noise pulses superimposed thereon. If the grid bias is properly adjusted, this signal appears in the cathode circuit output at about the same amplitude as the input signal, but with the noise pulses trimmed down to sync pulse level. The signal will also appear in reverse or positive polarity in the plate circuit of discharge device 24 with reduced noise peaks. The positive going signal appearing in the plate circuit is then coupled to the cathode of picture tube 32, and the negative going video signal appearing across cathode load resistor 27 is coupled to the control grid of picture tube 32 to thereby modulate the picture tube in a push-pull fashion. With a coupling circuit constructed in this manner, the total gain of the output stage is about 1.6, and provides an output signal of 80 volts from a 50 volt input signal.

As previously stated, the valve 42 which operates as a synchronizing signal separator also restores the direct current component to the signal at the grid of the valve 24. The alternating video signal appearing across cathode load resistor 27 is coupled through capacitor 41 to the cathode of electron discharge valve 42. It is to be noted, that if the tap on potentiometer 48 leading to the control grid of electron discharge valve 42 is at ground level, electron discharge valve 42 would act as a diode rectifier, producing pulses across potentiometer 48 which could be coupled back through resistor 51 to the control grid of electron discharge device 24 to thereby restore the incoming video signal to their original absolute values. It has been found desirable however, to provide a direct current component which is greater than the original value. To accomplish this, the adjustable tap on potentiometer 48, leading to the control grid of electron discharge valve 42, may be moved up along resistor 48, and the direct current voltage appearing across resistor 48 will therefore be increased. This increased direct current voltage is then applied through resistor 51 to the control grid of electron discharge device 24 to lift the incoming video signal to the desired direct current value.

In order to apply the proper amount of the direct current component to the cathode ray tube 32, the potential appearing across resistor 26 is applied to the cathode of the tube 32 through capacitor 31 which blocks the direct current component and passes only the alternating current component. The coupling between the cathode load resistor 27 and the control grid of the picture tube 32 permits the application of a controlled amount of the direct current component thereto. It is to be noted that the connection of resistor 36 to cathode load resistor 27 is fixed, and that the voltage coupled therethrough to the control grid of picture tube 32 is the full voltage developed across cathode load resistor 27. This path therefore provides the direct current component to the picture tube at substantially fixed level. Capacitor 37 presents a high impedance to the alternating current component so it is not substantially passed therethrough. To provide a means for varying the picture contrast a second path parallel to resistor 36 and adjustable along the length of cathode load resistor 27 is provided through capacitor 38 for coupling the alternating component of the received video signal to the control grid of picture tube 32. Resistor 39 has a high value so that direct current is not passed to any substantial extent from this point. By this arrangement the alternating current components of the video signal fed to the control grid of picture tube 32 can be varied to provide the required picture contrast without changing the background level. In order to control the background level, a fixed direct current bias is applied to the cathode of picture tube 32 from across voltage dividing network 33, 34 and 35, with the resistor 35 being adjustable to provide the required control.

Figure 2:
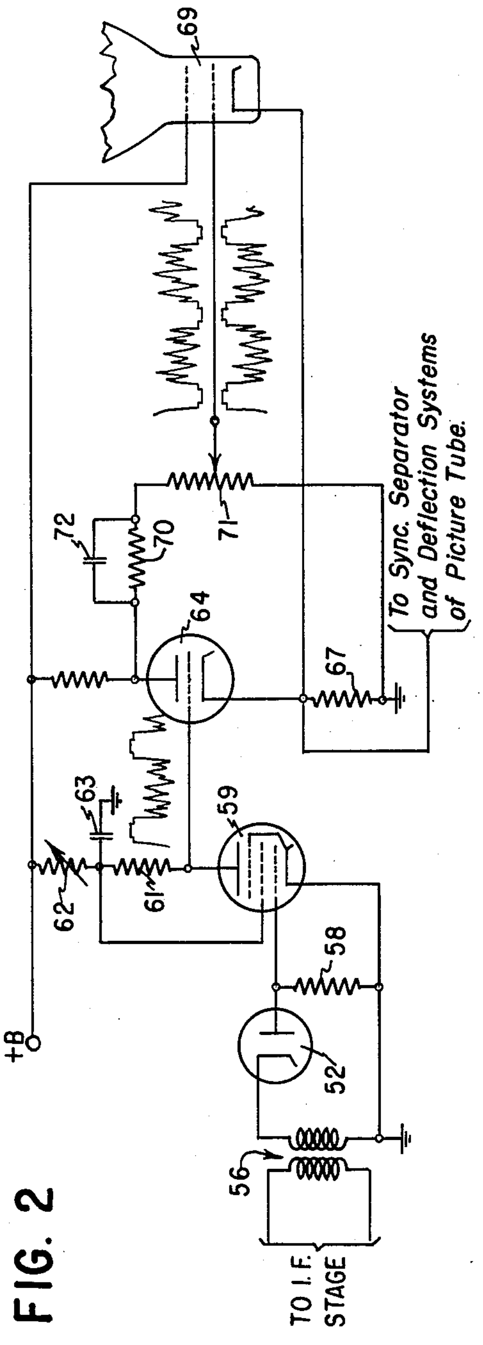
Fig. 2 is a circuit diagram of a modified form of the video circuit comprising the invention.

In Fig. 2 of the drawings, a second embodiment of the invention is illustrated. In this figure, transformer 56 represents the output transformer of the intermediate frequency amplifier stage 14 of a receiver such as shown in Fig. 1. Transformer 56 has a secondary connected to the cathode of a diode detector tube 57 having its plate connected to a load resistor 58. Load resistor 58 is directly connected to the control grid of electron discharge valve 59 which functions as a video amplifier stage. This connection applies both the alternating and direct current components of the video signal to the amplifier stage. The plate of valve 59 is connected through load resistors 61 and 62 to a source of positive potential B+. Capacitor 63 is connected to the junction of load resistors 61 and 62 and provides an alternating current bypass from this point. By connecting the plate of tube 59 in this manner a high D. C. voltage drop is obtained across the load resistors resulting in a D. C. to A. C. gain of the order of approximately 2 to 1.

The plate of electron discharge valve 59 is connected directly to the control grid of a second electron discharge valve 64 for applying both the alternating and direct current components thereto. Electron discharge valve 64 has its plate connected to the source of positive potential B+ through plate load resistor 66, and has its cathode connected to ground, through a cathode load resistor 67, which is substantially equal in value to the plate load resistor 66. The signals developed across the plate and cathode load resistors 66 and 67 are connected to the grid and cathode of the cathode ray tube 69. The plate of electron discharge device 64 is connected through resistor 70 to the contrast control potentiometer 71. Resistor 70 is bypassed by capacitor 72 and the movable top on potentiometer is connected to the control grid of the picture tube 69. The cathode of valve 64 is connected directly to the cathode of the picture tube 69 so that the voltage across load resistor 67 is applied directly to the cathode of picture tube 69.

Considering now the operation of the circuit of Fig. 2, a negative going video signal is provided across load resistor 58 of the detector and is applied to the grid of the valve 59. A positive going signal will therefore be provided at the plate of the valve 59 which has a direct current component which has been emphasized with respect to the alternating current component by a ratio of the order of 2 to 1. This is because the resistors 61 and 62 are of substantial equal value and the direct current drop is therefore substantially twice the alternating current drop. This signal from the plate of valve 59 is applied to the grid of valve 64 and appears as a negative going signal at the plate and a positive going signal at the cathode. Only the alternating current component of the signal is applied from the plate of the tube 64 to the grid of the picture tube and both the alternating and direct current components are applied from the cathode of the valve 64 to the cathode of the picture tube. It is therefore seen that the proper proportion of the alternating current and direct current components are restored at the picture tube. The alternating current component applied from the plate of valve 64 can be controlled to control the contrast of the picture substantially independently of the direct current component which controls the background illumination. This is because the condenser 72 passes only the alternating current components whereas the direct current component is substantially reduced by the resistor 70. However, the reduction of the alternating current component by movement of the tap of potentiometer 71 also reduces the direct current component. This causes the background to be darkened slightly as the contrast is reduced which is a desirable effect.

Figure 3:
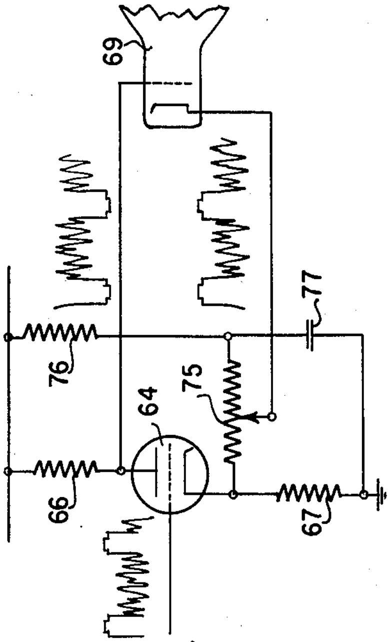
Figs. 3 and 4 are modifications of the circuit of Fig. 2.

A modified circuit for coupling the valve 64 to the picture tube 69 is illustrated in Fig. 3. In this circuit the plate of valve 64 is connected directly to the grid of valve of picture tube 69 and therefore applies both alternating current and direct current components. The voltage on the cathode load resistor 67 is applied to the cathode of the picture tube through a network including potentiometer 75 having one end terminal connected to the cathode of valve 64 and the other end terminal connected to the common connection between resistor 76 and condenser 77. Resistor 76 and condenser 77 are connected in series across B+ so that the condenser 77 charges through the resistor 76. As the movable tap of potentiometer 75 moves toward the end connected to condenser 77, the alternating current component applied to the cathode of the picture tube will decrease and the direct current value will shift from the value at the cathode of valve 64 to the value across condenser 77. The resistor 76 and condenser 77 may have such values that the voltage across condenser 77 will be less than the voltage at the cathode of valve 64 so that the picture will darken as the contrast is reduced.

Figure 4:
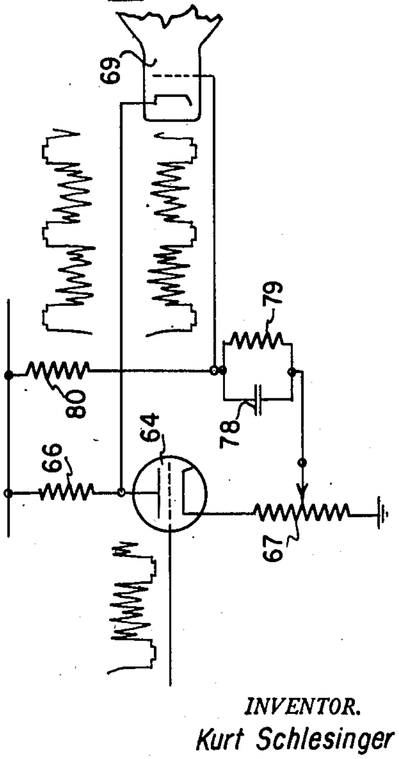

Fig. 4 shows a further embodiment of the invention which illustrates that the system can also be used in circuits in which negative going video signals are applied to the output valve 64 (as in Fig. 1). In such a circuit the plate of the valve 64 is connected directly to the cathode of the picture tube 69 and applies both the alternating and direct current components of the signal thereto. The signal from the cathode load resistor 67 may be applied from various points thereon through capacitor 78 to the grid of the picture tube 69. Resistors 79 and 80 serve to establish the direct current bias of the grid. It is therefore apparent that as the signal applied from the cathode resistor 67 to the control grid of the picture tube is increased to thereby increase the contrast, the direct current bias applied to the grid will also be slightly increased so that the picture brightness increases with the contrast. Conversely, the picture will darken slightly with decreasing contrast providing the desired result.

From the foregoing description, it can be appreciated that the invention provides a novel coupling circuit for use in the video output stages of a television receiver which greatly improves the picture contrast. This intensifier action is accomplished in a very simple circuit which is adaptable to various receiver circuits. The circuit provides for variation in the contrast with only slight variations in the background illumination, which latter variations are in the desired directions. In addition to providing these advantages, the circuit provides amplification of the signal while faithfully reproducing the wave shape of the incoming video signal.

Obviously, other modifications and variations of the invention are possible from the light of the above teachings. It is therefore to be understood that such changes are within the full intended scope of the invention as defined by the appended claims.

I claim:

1. A television receiver including in combination, a cathode ray picture tube having at least two input electrodes, an output stage including an electron discharge valve having at least a plate and a cathode, means for applying a video signal having an alternating current component and a direct current component to said valve, a first load circuit connected to said plate of said electron discharge valve, and a second load circuit connected to said cathode of said electron discharge valve, and coupling circuit means including a first circuit portion connecting said first load circuit to one of said input electrodes of said picture tube, and a second circuit portion connecting said second load circuit to the other one of said input electrodes of said picture tube, said first and second circuit portions both applying the alternating current component of said video signal to said input electrodes of said picture tube, and at least one of said circuit portions applying said direct current component of said video signal to said input electrodes of said picture tube.

2. A television receiver including in combination, a cathode ray picture tube having at least two input electrodes, an output stage including an electron discharge valve having an anode, a cathode and a control electrode, means for applying a video signal having alternating current and direct current components to said control electrode, first and second load circuits having substantially the same impedance individually connected to said anode and said cathode, and circuit means individually connecting said load circuits of said electron discharge valve to said input electrodes of said picture tube, so that at least said alternating current component of said video signal is applied to both of said input electrodes in push-pull relation.

3. A television receiver including in combination, a cathode ray picture tube having at least two input electrodes, an output stage including an electron discharge valve having an anode and a cathode, first and second load circuits having substantially the same impedance individually connected to said anode and said cathode, and circuit means individually connecting said load circuits of said electron discharge valve to said input electrodes of said picture tube and applying the alternating current component of the signal in said electron discharge valve to both said input electrodes, said circuit means including a coupling circuit connecting one of said load circuits to one of said input electrodes of said tube which presents high impedance to direct current, said coupling circuit including variable impedance means for controlling the alternating current transmitted thereby.

4. An output circuit for a television receiver which includes a cathode ray picture tube having at least two input electrodes including, an output stage having an electron discharge valve including anode and cathode output electrodes, first and second load circuits having substantially the same impedance individually connected to said output electrodes, and circuit means individually coupling said output electrodes of said electron discharge valve to said input electrodes of said picture tube and applying the alternating current component of the signal in said electron discharge valve to both said input electrodes, said circuit means including a circuit connecting one of said output electrodes of said valve to one of said input electrodes of said tube having high impedance to direct current and including variable impedance means for controlling the alternating current transmitted thereby.

5. A television receiver including a cathode ray picture tube having at least two input electrodes, and an output circuit for applying a video signal to said picture tube in push-pull, said output circuit including an electron discharge valve having anode and cathode output electrodes and a control electrode, means for applying a video signal to said control electrode, having direct current and alternating current components, first and second load circuits connected to said output electrodes of said electron discharge valve having substantially the same impedance, circuit means connecting said load circuits to said input electrodes of said picture tube for applying alternating current signals to both said input electrodes, said circuit portion means including a circuit having high impedance to said direct current component, and also including variable means for controlling the alternating current component transmitted thereover so that said alternating current component can be controlled substantially independently of said direct current component.

6. A television receiver including a cathode ray picture tube having first and second input electrodes, and an output circuit for applying a video signal to said picture tube in push-pull, said output circuit including an electron discharge valve having anode and cathode output electrodes, and a control electrode, means for applying a video signal to said control electrode having a direct current component which is greater in proportion than the alternating current component, a first load circuit connected to one of said output electrodes of said electron discharge valve, a second load circuit having substantially the same resistance as said first load circuit connected to the other output electrode of said electron discharge valve, coupling circuit means including circuit portions individually connected between said load circuits of said electron discharge valve and said input electrodes of said tube and applying the alternating current component of the signal in said electron discharge valve to both said input electrodes, one of said circuit portions having a relatively high impedance to said direct current component and a relatively low impedance to said alternating current component so that the proportion of said alternating current component to said direct current component is increased, said one circuit portion including variable impedance means for controlling the transmission of said alternating current component therethrough.

7. A television receiver including a cathode ray picture tube having first and second input electrodes, and an output circuit for applying a video signal to said input electrodes of said picture tube in push-pull, said output circuit including an electron discharge valve having a cathode, an anode, and a control grid, means for applying a video signal having alternating and direct current components to said control grid, first and second load circuits individually connected to said cathode and said anode of said electron discharge valve, coupling circuit means including circuit portions connected between said load circuits of said electron discharge valve and said first and second input electrodes of said tube for applying at least the alternating component of said video signal to said electrodes in push-pull relation, and a small coupling capacitor connected between said control grid and said cathode so that the signal at said cathode follows the signal at said control grid very rapidly.

8. A television receiver including in combination, a cathode ray picture tube having at least two input electrodes, an output stage including an electron discharge valve having at least a plate and a cathode, a first load circuit connected to said plate of said electron discharge valve, and a second load circuit connected to said cathode of said electron discharge valve, said first and second load circuits having substantially the same resistance, a first coupling circuit connected to said first load circuit of said electron discharge valve and to one of said input electrodes of said picture tube providing an alternating current coupling therebetween, and a second coupling circuit connected to said second load circuit of said electron discharge valve and to the other one of said input electrodes of said picture tube providing alternating and direct current coupling therebetween.

9. A television receiver including a cathode ray picture tube having first and second input electrodes, and an output circuit for applying a video signal to said picture tube in push-pull, said output circuit including an electron discharge valve having at least a cathode, an anode, and a control electrode, means for applying a video signal having direct current and alternating current components to said control electrode, a first load circuit connected to said anode of said discharge valve, a second load circuit having resistance of substantially equal value to said first load circuit connected to said cathode of said discharge valve, a coupling capacitor coupled between said plate of said discharge valve and said first electrode of said picture tube, variable impedance means for applying a direct current bias to said first electrode, a direct current connection from said cathode of said discharge device to said second input electrode of said picture tube, and a coupling capacitor connecting said second electrode to varying positions along said cathode load resistor whereby the amplitude of the alternating current signal applied to said second electrode may be varied.

10. A television receiver including a cathode ray picture tube having first and second electrodes, and an output circuit for applying a video signal to said picture tube in push-pull, said output circuit including an electron discharge valve having a cathode, an anode, and a control electrode, means for applying a video signal to said control electrode having a direct current component which is greater in proportion than the alternating current component, a first load circuit connected to said anode of said electron discharge valve, a second load circuit having substantially the same resistance as said first load circuit connected to said cathode of said electron discharge valve, coupling circuit means including circuit portions connected between said first and second load circuits of said electron discharge valve and said first and second electrodes of said tube, said circuit portion connected to said first load circuit having a high impedance to said direct current component and including means for reducing the signal transmitted therethrough to said picture tube, said last named means reducing said direct current component and said alternating current component in the same sense and reducing said alternating current component by a greater amount than said direct current component.

11. A television receiver including in combination, a cathode ray picture tube having at least two input electrodes, an output circuit including a first electron discharge valve having a plurality of electrodes including an anode, resistance means connected to said anode of said valve, a video frequency bypass capacitor connected to said resistance means intermediate the ends thereof providing a bypass therefor to a point of reference potential, a second electron discharge valve having output electrodes and a control grid, a direct current connection between the plate of said first tube and the control grid of said second tube, first and second load circuits individually connected to said output electrodes of said second tube, said first and second load circuits having substantially the same impedance, said second tube, coupling circuit means passing alternating current components only coupled between one of said load circuits and one of said input electrodes of said picture tube, and coupling means passing both alternating and direct current components coupled between the other one of said load circuits and the other input electrode.

12. A television receiver including in combination, a cathode ray picture tube having at least two input electrodes, an output circuit including a first electron discharge valve having a plurality of electrodes including an anode, load resistor means connected to said anode, a video frequency bypass capacitor bypassing a portion of said load resistor means to a point of reference potential so that the direct current component of the video signal at said anode is emphasized with respect to the alternating current component thereof, a second electron discharge valve having at least an anode, a cathode and a control grid, a direct connection between said anode of said first valve and said control grid of said second valve, a load resistor connected in the anode circuit of said second valve, a load resistor substantially equal in value to said last mentioned load resistor connected in the cathode circuit of said second valve, coupling circuit means passing alternating current components only coupled between said anode and one of said input electrodes of said picture tube, and coupling circuit means connected between said cathode and the other one of said input electrodes of said picture tube for applying both said direct and alternating current components of said signal thereto.

13. A television receiver including a cathode ray picture tube having at least two input electrodes, a video detector having a load resistor, a first electron discharge valve having at least a cathode, an anode and a control grid, said control grid being coupled to said video detector load resistor, load resistor means connected in the anode circuit of said first discharge valve, a video frequency bypass condenser bypassing a portion of said load resistor means to a point of reference potential, a second electron discharge valve having at least an anode, a cathode, and a control electrode, said last mentioned control electrode being directly connected to the anode of said first electron discharge valve, a load circuit connected to said anode of said second electron discharge valve, a load circuit having substantially the same resistance as said first load circuit connected to said cathode of said second discharge valve, a direct connection between the cathode of said discharge valve and one of said input electrodes of said picture tube, and a coupling circuit connected between the anode of said second discharge valve and the other one of said input electrodes of said picture tube, said coupling circuit including capacitor means providing a low impedance path for the alternating current component of said video signal, and voltage divider means for controlling the signal applied to said other electrode of said picture tube.

References Cited in the file of this patent

UNITED STATES PATENTS

| Number | Name | Date |
|---|---|---|
| 2,255,484 | Dome | Sept. 9, 1941 |
| 2,301,522 | Cawein | Nov. 10, 1942 |
| 2,310,455 | Muller | Feb. 9, 1943 |
| 2,489,155 | Richter | Nov. 22, 1949 |
| 2,494,657 | Haantjes | Jan. 17, 1950 |
| 2,501,110 | Walker | Mar. 21, 1950 |
| 2,533,081 | Anderson et al. | Dec. 5, 1950 |
| 2,537,807 | Anderson | Jan. 9, 1951 |